(12) United States Patent
Huang et al.

(10) Patent No.: US 12,010,516 B2
(45) Date of Patent: Jun. 11, 2024

(54) MULTI-LINK DEVICE SECURITY ASSOCIATION QUERY

(71) Applicant: Intel Corporation, Santa Clara, CA (US)

(72) Inventors: Po-Kai Huang, San Jose, CA (US); Ido Ouzieli, Tel Aviv (IL); Danny Alexander, Neve Efraim Monoson (IL); Daniel F. Bravo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 603 days.

(21) Appl. No.: 17/132,158

(22) Filed: Dec. 23, 2020

(65) Prior Publication Data

US 2021/0112414 A1    Apr. 15, 2021

Related U.S. Application Data

(60) Provisional application No. 63/065,709, filed on Aug. 14, 2020.

(51) Int. Cl.
| | |
|---|---|
| *H04B 7/204* | (2006.01) |
| *H04W 12/082* | (2021.01) |
| *H04W 48/02* | (2009.01) |
| *H04W 48/14* | (2009.01) |
| *H04W 84/12* | (2009.01) |

(52) U.S. Cl.
CPC ......... *H04W 12/082* (2021.01); *H04W 48/02* (2013.01); *H04W 48/14* (2013.01); *H04W 84/12* (2013.01)

(58) Field of Classification Search
CPC ... H04W 12/082; H04W 48/02; H04W 48/14; H04W 84/12
See application file for complete search history.

(56) References Cited

U.S. PATENT DOCUMENTS

| | | | | |
|---|---|---|---|---|
| 2017/0006526 | A1* | 1/2017 | Seok | H04W 60/04 |
| 2021/0392571 | A1* | 12/2021 | Kneckt | H04W 48/10 |
| 2023/0050803 | A1* | 2/2023 | Gan | H04W 76/19 |

* cited by examiner

*Primary Examiner* — Ivan O Latorre
*Assistant Examiner* — Hidayat Dabiri
(74) *Attorney, Agent, or Firm* — Schwegman Lundberg & Woessner, P.A.

(57) ABSTRACT

Multi-link device (MLD) security association (SA) query and query response procedures are described. Any of the links between an access point (AP) MLD and a non-AP MLD may be used to initiate association, reassociation, or disassociation procedures using the SA query requests and responses. The SA query request or response from one of the stations (STAs) associated with the MLD is sent to a corresponding linked one of the STAs associated with the other MLD. The SA request or response is addressed to the other MLD rather than the STA of the other MLD. Retry timeouts and maximum timeouts for resending SA query requests are set by the AP MLD and the same across each of the links.

19 Claims, 9 Drawing Sheets

MULTI-LINK DEVICE SECURITY ASSOCIATION QUERY

PRIORITY

This application claims the benefit of priority to U.S. Provisional Patent Application Ser. No. 63/065,709, filed Aug. 14, 2020 which is incorporated herein by reference in its entirety.

TECHNICAL FIELD

Aspects pertain to systems and methods for wireless communications. Some aspects relate to communication security and, more particularly, to a multi-link device (MLD) security association query.

BACKGROUND

Efficient wireless local-area network (WLAN) resource use continues to increase in importance as the number and types of wireless communication devices as well as the amount of data and bandwidth being used by various applications, such as video streaming, operating on these devices continues to increase. In many instances, providing sufficient bandwidth and acceptable response times to the users of the WLAN may be challenging, especially when a large number of devices try to share the same resources. It may moreover be desirable for wireless communication devices to incorporate security mechanisms associated with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Figure 1:
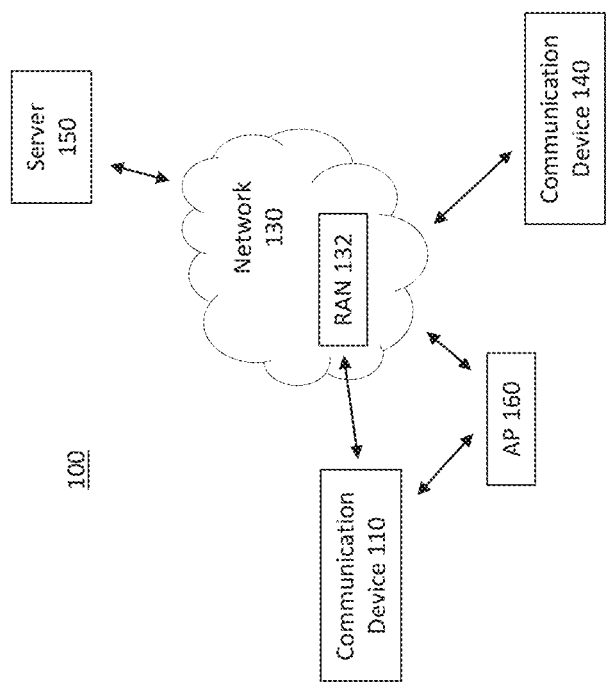
FIG. 1 is a functional block diagram illustrating a system in accordance with some aspects.

FIG. 1 is a functional block diagram illustrating a system according to some aspects. The system 100 may include multiple communication devices (STAs) 110, 140. In some aspects, one or both the communication devices 110, 140 may be communication devices that communicate with each other directly (e.g., via P2P or other short range communication protocol) or via one or more short range or long range wireless networks 130. The communication devices 110, 140 may, for example, communicate wirelessly locally, for example, via one or more random access networks (RANs) 132, WiFi access points (APs) 160 or directly using any of a number of different techniques and protocols, such as WiFi, Bluetooth, or Zigbee, among others. The RANs 132 may contain one or more base stations such as evolved NodeBs (eNBs) and $5^{th}$ generation NodeBs (gNBs) and/or micro, pico and/or nano base stations.

The communication devices 110, 140 may communicate through the network 130 via Third Generation Partnership Project Long Term Evolution (3GPP LTE) protocols and LTE advanced (LTE-A) protocols, 4G protocols or 5G protocols. Examples of communication devices 110, 140 include, but are not limited to, mobile devices such as portable handsets, smartphones, tablet computers, laptop computers, wearable devices, sensors and devices in vehicles, such as cars, trucks or aerial devices (drones). In some cases, the communication devices 110, 140 may communicate with each other and/or with one or more servers 150. The particular server(s) 150 may depend on the application used by the communication devices 110, 140.

The network 130 may contain network devices such as a gateway (e.g., a serving gateway and/or packet data network gateway), a Home Subscriber Server (HSS), a Mobility Management Entity (MME) for LTE networks or an Access and Mobility Function (AMF), User Plane Function (UPF), Session Management Function (SMF) etc., for 5G networks. The network 130 may also contain various servers that provide content or other information related to user accounts.

Figure 2:
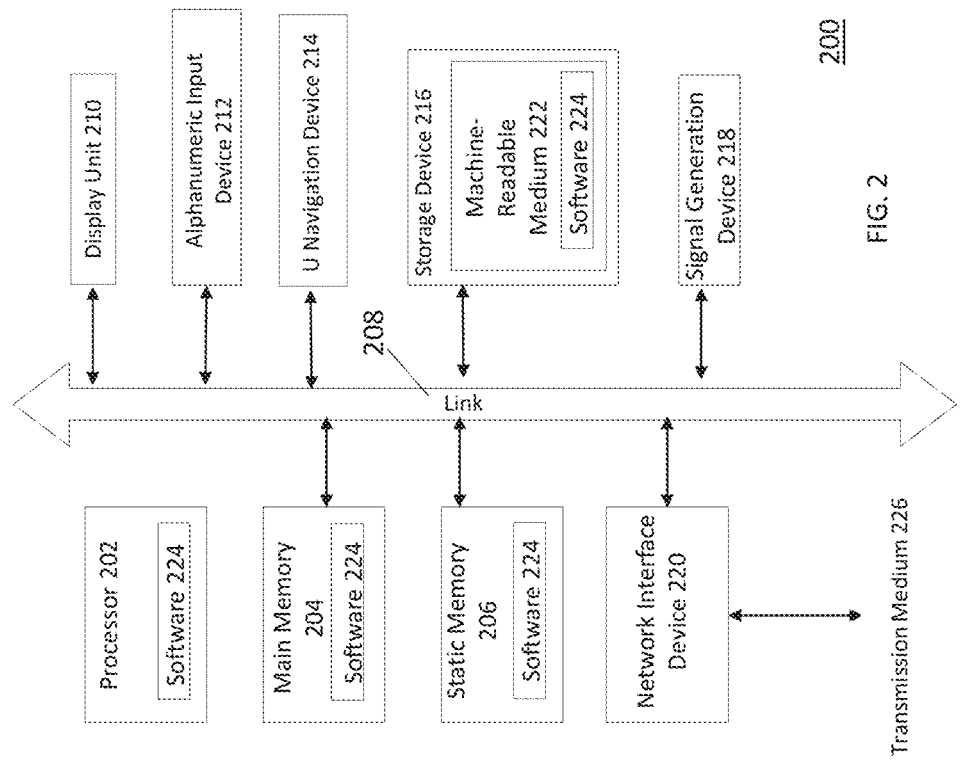
FIG. 2 illustrates a block diagram of a communication device in accordance with some aspects.

FIG. 2 illustrates a block diagram of a communication device in accordance with some embodiments. The communication device 200 may be a communication device such as a specialized computer, a personal or laptop computer (PC), a tablet PC, or a smart phone, dedicated network equipment, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., communication device, AP) for reception by the receiving entity (e.g., AP, communication device) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Devices may operate in accordance with existing IEEE 802.11, 802.11a, 802.11b, 802.11e, 802.11g, 802.11h, 802.11i, 802.11n, 802.11ac, 802.11an, 802.11ax, 802.16, 802.16d, 802.16e standards and/or future versions and/or derivatives and/or Long Term Evolution (LTE) of the above standards. Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth, ZigBee, or the like.

Security association (SA) query is a mechanism developed between an AP and a non-AP STA that associates to the AP to deal with two security scenarios.

Scenario 1: An attacker sends associate frame or re-associate frame. In this case, the AP deletes the associated status and key of the non-AP STA if there is no SA query mechanism. Under the SA query mechanism, the AP rejects the association request with the reason of REFUSED_TEMPORARILY, sets the appropriate timeout value, and sends a protected SA query request every dot11AssociationSAQueryRetryTimeout time unit. If the non-AP STA responds with a protected SA query response, then the AP knows that the association request is sent by the attacker, and no further action is taken.

Scenario 1.1: the non-AP STA sends an associate or re-associate request frame due to a restart and loss of key. If the non-AP STA loses the key established with the AP due to restart, the non-AP STA does not decrypt a protected SA query request from the AP and thus does not respond using a SA query response. After a dot11AssociationSAQueryMaximumTimeout time unit, the AP then accepts the following association request or re-association request from the non-AP STA.

Scenario 2: An attacker sends an unprotected disassociate frame. In this case, the non-AP STA is disassociated if there is no SA query mechanism. Under the SA query mechanism, the non-AP STA sends a protected SA query request every dot11AssociationSAQueryRetryTimeout time units, and if the AP responds with a protected SA query response, then the non-AP STA knows that the unprotected disassociate frame is sent by the attacker.

Scenario 2.1: the AP sends an unprotected disassociate frame due to restart and loss of key. If the AP loses the key established with the non-AP STA due to a restart, the non-AP STA does not see the protected SA query response while transmitting a protected SA query request. As a result, after dot11AssociationSAQueryMaximumTimeout, the non-AP STA deletes the associated status and key and goes to an unassociated and unauthenticated state with the AP.

Under the multi-link framework, the SA query response between two MLDs is to be expanded. In one embodiment, an MLD SA query system may expand SA query response procedure between two MLDs by changing the communication context from the AP and non-AP STA that associated with the AP to AP MLD and non-AP MLD that associates with the AP MLD. The existing sequences can be reused. The dot11AssociationSAQueryRetryTimeout is the retry timeout for the AP MLD or non-AP MLD that sends the SA query request in any link. The dot11AssociationSAQueryMaximumTimeout is the timeout to stop sending further SA query requests for the AP MLD or non-AP MLD in any link. The existing procedures of SA query and frame sequence can be reused.

Figure 3:
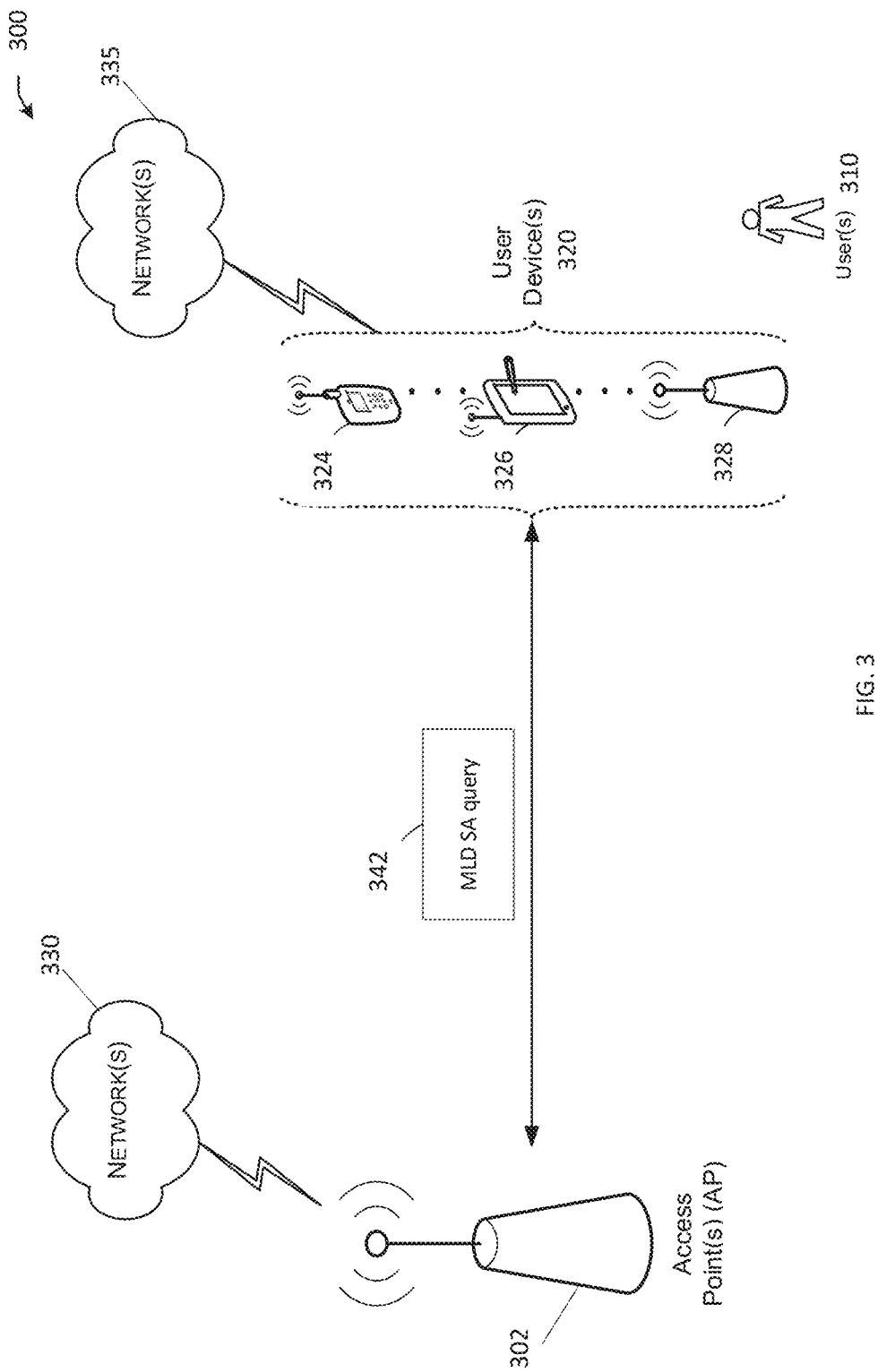
FIG. 3 is a network diagram illustrating a network environment for a multi-link device (MLD) security association (SA) query in accordance with some aspects.

FIG. 3 is a network diagram illustrating a network environment for a MLD SA query in accordance with some aspects. Wireless network 300 may include one or more user devices 320 and one or more access points(s) (AP) 302, which may communicate in accordance with IEEE 802.11 communication standards. The user device(s) 320 may be mobile devices that are non-stationary (e.g., not having fixed locations) or may be stationary devices. In some embodiments, the user devices 320 and the AP 302 may include one or more computer systems and/or the example machine/system of FIG. 2.

One or more illustrative user device(s) 320 and/or AP(s) 302 may be operable by one or more user(s) 310. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 320 and the AP(s) 302 may be STAs. The one or more illustrative user device(s) 320 and/or AP(s) 302 may operate as a personal basic service set (PBSS) control point/access point (PCP/AP). The user device(s) 320 (e.g., 324, 326, or 328) and/or AP(s) 302 may include any suitable processor-driven device including, but not limited to, a mobile device or a non-mobile, e.g., a static device. For example, user device(s) 320 and/or AP(s) 302 may include, a UE or STA, an AP, a software enabled AP (SoftAP), a PC, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a CPU, microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 320 and/or AP(s) 302 may also include mesh stations in, for example, a mesh network, in accordance with one or more IEEE 802.11 standards and/or 3GPP standards.

Any of the user device(s) 320 (e.g., user devices 324, 326, 328), and AP(s) 302 may be configured to communicate with each other via one or more communications networks 330 and/or 335 wirelessly or wired. The user device(s) 320 may also communicate peer-to-peer or directly with each other with or without the AP(s) 302. Any of the communications networks 330 and/or 335 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 330 and/or 335 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 330 and/or 335 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 320 (e.g., user devices 324, 326, 328) and AP(s) 302 may include one or more communications antennas. The one or more communications antennas may be any suitable type of antennas corresponding to the communications protocols used by the user device(s) 320 (e.g., user devices 324, 326 and 328), and AP(s) 302. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 320 and/or AP(s) 302.

Any of the user device(s) 320 (e.g., user devices 324, 326, 328), and AP(s) 302 may be configured to perform directional transmission and/or directional reception in conjunction with wirelessly communicating in a wireless network. Any of the user device(s) 320 (e.g., user devices 324, 326, 328), and AP(s) 302 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 320 (e.g., user devices 324, 326, 328), and AP(s) 302 may be configured to perform any given directional transmission towards one or more defined transmit sectors. Any of the user device(s) 320 (e.g., user devices 324, 326, 328), and AP(s) 302 may be configured to perform any given directional reception from one or more defined receive sectors.

MIMO beamforming in a wireless network may be accomplished using RF beamforming and/or digital beamforming. In some embodiments, in performing a given MIMO transmission, user devices 320 and/or AP(s) 302 may be configured to use all or a subset of its one or more communications antennas to perform MIMO beamforming.

Any of the user devices 320 (e.g., user devices 324, 326, 328), and AP(s) 302 may include any suitable radio and/or transceiver for transmitting and/or receiving radio frequency (RF) signals in the bandwidth and/or channels corresponding to the communications protocols utilized by any of the user device(s) 320 and AP(s) 302 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 3, AP 302 may facilitate MLD SA query 342 with one or more user devices 320. It is understood that the above descriptions are for purposes of illustration and are not meant to be limiting.

Figure 4:
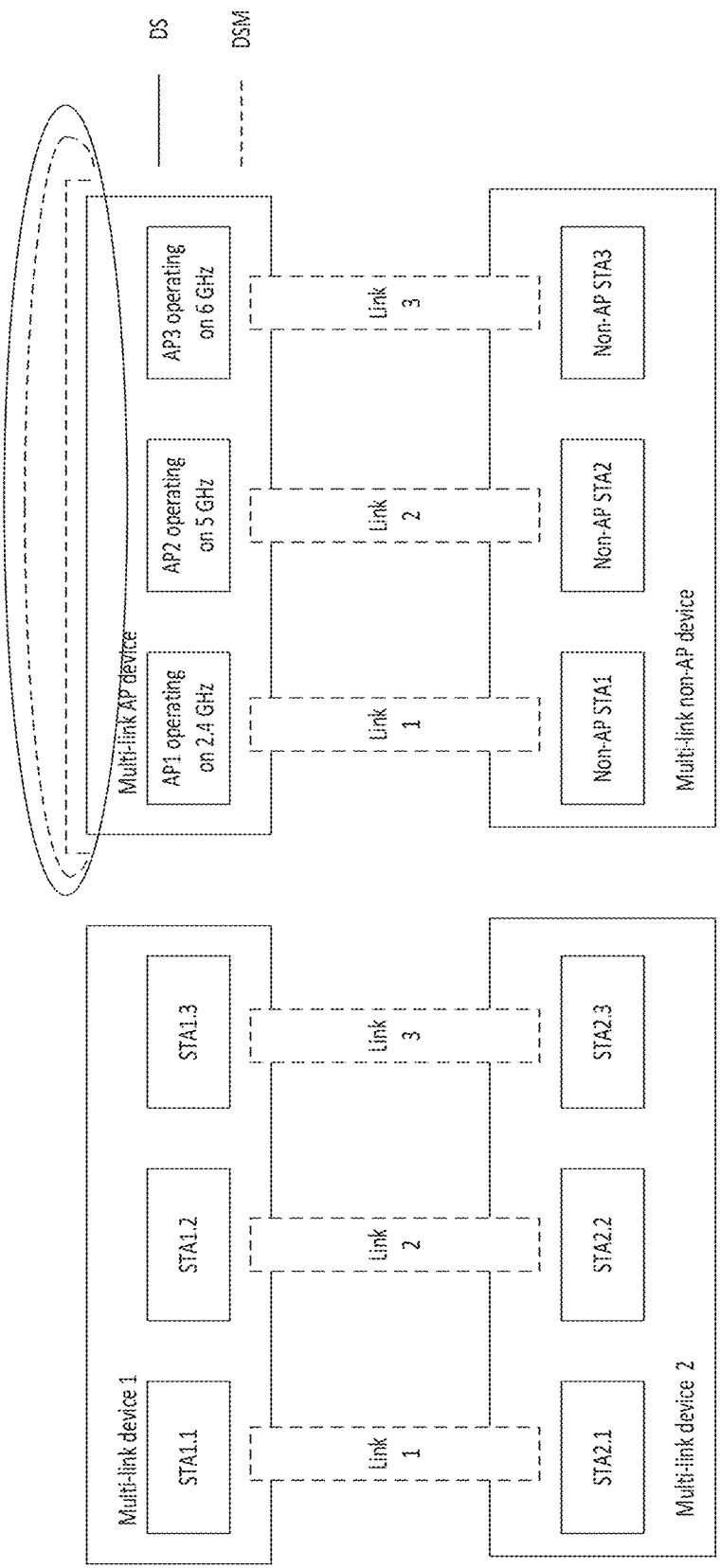
FIG. 4 depicts an illustrative schematic diagram for an MLD SA query in accordance with some aspects.

FIG. 4 depicts an illustrative schematic diagram for an MLD SA query in accordance with some aspects. As shown in FIG. 4, two multi-link devices on either side include multiple STAs that can set up a link with each other. As used herein an MLD is a logical entity that contains one or more STAs. The logical entity has one medium access control layer (MAC) data service interface and primitives to the logical link control (LLC) and a single address associated with the interface, which can be used to communicate on the distribution system medium (DSM). A Multi-link device allows STAs within the multi-link logical entity to have the same MAC address.

For infrastructure framework, a multi-link AP device includes APs on one side and a multi-link non-AP device that includes non-APs on the other side. A multi-link AP device (AP MLD) is a multi-link device in which each STA within the multi-link device is an Extremely High Throughput (EHT) AP. A multi-link non-AP device (non-AP MLD) is a multi-link device in which each STA within the multi-link device is a non-AP EHT STA. This framework is a natural extension from the one link operation between two STAs, which are the AP and non-AP STA under the infrastructure framework.

The states of the AP MLD and non-AP MLD include:

State 1: Unauthenticated and Unassociated between the AP MLD and non-AP MLD. This is an initiate state.

State 2: Authenticated and unassociated between the AP MLD and non-AP MLD. In this case, the non-AP MLD authenticates with the AP MLD after having an authentication request/response exchange with the AP MLD to have an IEEE 802.11 authentication and authenticate between the AP MLD and non-AP MLD.

State 3: Authenticated and associated between the AP MLD and non-AP MLD. The non-AP MLD associates with the AP MLD after having an association request/response exchange with the AP MLD to set up the links. The non-AP MLD then re-associates with the AP MLD after having a re-association request/response exchange with the AP MLD to set up the links.

State 4: Authenticated, associated, and Robust Security Network Association (RSNA) established between the AP MLD and non-AP MLD. In this case, the non-AP MLD establishes a RSNA with the AP MLD to unblock an IEEE 802.1X controlled port. The non-AP MLD establishes a RSNA with the AP MLD through a 4-way handshake between the AP MLD and non-AP MLD, a fast transition between the AP MLD and non-AP MLD, or a fast initial link setup (FILS) procedure between the AP MLD and non-AP MLD. The SA procedure then continues for the AP MLD and non-AP MLD. The AP MLD is allowed to transmit or retransmit the SA query request in any link setup with the non-AP MLD. The non-AP MLD is allowed to transmit or retransmit the SA query request in any link setup with the AP MLD.

The AP MLD is allowed to transmit or retransmit the SA query response in any link setup with the non-AP MLD after receiving the SA query request. The non-AP MLD is allowed to transmit or retransmit the SA query response in any link setup with the AP MLD after receiving the SA query request. The SA query request is addressed to the MLD if the SA query request is sent to a STA affiliated with the MLD. The SA query response is addressed to the MLD if the SA query response is sent to a STA affiliated with the MLD. A disassociation frame is addressed to the MLD if the SA query response is sent to a STA affiliated with the MLD. A frame is addressed to the MLD if the SA query response is sent to a STA affiliated with the MLD. The procedure then continues to send the SA query response.

An MLD that supports the SA query procedure and receives the SA query request frame responds with the SA query response frame if none of the following are true: the MLD is not currently associated to the MLD that sent the SA Query Request frame; the MLD has sent a (Re)Association Request frame within dot11AssociationResponseTimeOut time unit but has not received a corresponding (Re)Association Response frame; dot11RSNAOperatingChannelValidation Activated is true and the sending MLD had indicated Operating Channel Validation Capable (OCVC) capability in its association and either: the overloaded CDMA interconnect (OCI) element is not present in the request or the operating channel information of a link indicated does not match the current channel information of the link.

Continuing with the procedure for the non-AP MLD to send the SA query request, the existing procedure may be expanded to MLD. In one or more embodiments, a MLD SA query system may facilitate that if a non-AP MLD that has an SA with its AP MLD for an association that negotiated management frame protection receives an unprotected Deauthentication or Disassociation frame with reason code INVALID_CLASS2_FRAME or INVALID_CLASS3_FRAME from the AP MLD, the non-AP MLD may use this as an indication that there might be a mismatch in the association state between itself and the AP MLD. In such a case, the non-AP MLD's MLD management entity (MLDME) may initiate the SA Query procedure with the AP MLD to verify the validity of the SA by issuing one MLME-SA-QUERY.request primitive every dot11AssociationSAQueryRetryTimeout time units until a matching MLME-SA-QUERY.confirm primitive is received or dot11AssociationSAQueryMaximumTimeout time units from the beginning of the SA Query procedure has passed. If the AP MLD responds to the SA Query request with a valid SA Query response, the non-AP MLD should continue to use the SA. If no valid SA Query response is received, the non-AP MLD's MLDME may delete the SA and temporal keys held for communication with the non-AP MLD by issuing an MLME-DELETEKEYS.request primitive and the non-AP MLD may move into State 1 with the AP MLD.

A MLME-SA-QUERY.request primitive initiates transmission of a protected SA query request. A matching MLME-SA-QUERY.confirm primitive is from a reception of protected a SA query response. dot11AssociationSAQueryRetryTimeout and dot11AssociationSAQueryMaximumTimeout is from the perspective of the non-AP MLD. The procedure for the AP MLD to send the SA query request may then continue, expanding the existing association procedure to MLD as per the following:

Otherwise, if the state for the non-AP MLD is 4, the non-AP MLD has a valid security association, the non-AP MLD has negotiated management frame protection, and there has been no earlier, timed out SA Query procedure with the non-AP MLD (which would have allowed a new association process to be started, without an additional SA Query procedure):

1) The MLDME shall refuse the association request by issuing an MLME-ASSOCIATE.response primitive with ResultCode REFUSED_TEMPORARILY and TimeoutInterval containing a Timeout Interval element with the Timeout Interval Type field set to 3 (Association Comeback time). If the MLDME is in an ongoing SA Query with the non-AP MLD the Timeout Interval Value field shall be set to the remaining SA Query period, otherwise it shall be set to dot11AssociationSAQueryMaximumTimeout.
2) The state for the non-AP MLD shall be left unchanged.
3) Following this, if the MLDME is not in an ongoing SA Query with the non-AP MLD, the MLDME shall issue one MLME-SA-QUERY.request primitive addressed to the non-AP MLD, every dot11AssociationSAQueryRetryTimeout timeout units until an MLME-SA-QUERY.confirm primitive for the non-AP MLD, is received or dot11AssociationSAQueryMaximumTimeout timeout units from the beginning of the SA Query procedure have passed. The MLDME shall increment the TransactionIdentifier by 1 for each MLME-SA-QUERY.request primitive, rolling the value over to 0 after the maximum allowed value is reached.
4) If no MLME-SA-QUERY.confirm primitive for the non-AP MLD is received within the dot11AssociationSAQueryMaximumTimeout period, the MLDME shall allow a subsequent association process with the non-AP MLD to be started without starting an additional SA Query procedure, except that the MLDME may deny a subsequent association process with the non-AP MLD if a MAC service data unit (MSDU) was received from the non-AP MLD within this period.

Reception of an MSDU implies reception of a valid protected frame, which may obviate the use of the SA Query procedure.

The MLDME shall generate an MLME-ASSOCIATE.response primitive with the PeerSTAAddress parameter set to the MAC address of the non-AP MLD, identified by the PeerSTAAddress parameter of the MLME-ASSOCIATE.indication primitive. If the ResultCode in the MLME-ASSOCIATE.response primitive is SUCCESS, the MLDME has an existing SA with the non-AP MLD, and an SA Query procedure with that non-AP MLD has failed to receive a valid response (i.e., has not received an MLME-SA-QUERY.confirm primitive within the dot11AssociationSAQueryMaximumTimeout period), the MLDME shall issue an MLME-DISASSOCIATE.request primitive addressed to the non-AP MLD with ReasonCode INVALID_AUTHENTICATION.

A MLME-SA-QUERY.request primitive initiates transmission of protected SA query request. A matching MLME-SA-QUERY.confirm primitive is from a reception of protected SA query response. A MLME-DISASSOCIATE.request primitive initiates transmission of disassociation frame. dot11AssociationSAQueryRetryTimeout and dot11AssociationSAQueryMaximumTimeout is from the perspective of AP MLD.

The procedure for the AP MLD to send the SA query request continues, expanding the existing reassociation procedure to MLD as the following:

If the state for the non-AP MLD is 4, the non-AP MLD has a valid security association, the non-AP MLD has negotiated management frame protection, the reassociation is not a part of a fast transition, and there has been no earlier, timed out SA Query procedure with the non-AP MLD (which would have allowed a new reassociation process to be started, without an additional SA Query procedure):

1) The MLDME shall refuse the reassociation request by issuing an MLME-REASSOCIATE.response primitive with ResultCode REFUSED_TEMPORARILY and TimeoutInterval containing a Timeout Interval element with the Timeout Interval Type field set to 3 (Association Comeback time). If the MLDME is in an ongoing SA Query with the non-AP MLD, the Timeout Interval Value field shall be set to the remaining SA Query period, otherwise it shall be set to dot11AssociationSAQueryMaximumTimeout.
2) The state for the non-AP MLD shall be left unchanged.
3) Following this, the MLDME is not in an ongoing SA Query with the non-AP MLD, the MLDME shall issue one MLME-SA-QUERY.request primitive addressed to the non-AP MLD every dot11AssociationSAQueryRetryTimeout timeout units until an MLME-SA-QUERY.confirm primitive for the non-AP MLD is received or dot11AssociationSAQueryMaximumTimeout timeout units from the beginning of the SA Query procedure have passed. The MLDME shall increment the TransactionIdentifier by 1 for each MLME-SA-QUERY.request primitive, rolling the value over to 0 after the maximum allowed value is reached.
4) If no MLME-SA-QUERY.confirm primitive for a non-AP MLD is received within the dot11AssociationSAQueryMaximumTimeout period, the MLDME shall allow a subsequent reassociation process to be started without starting an additional SA Query procedure, except that the MLDME may deny a subsequent reassociation process with the non-AP MLD if an MSDU was received from the non-AP MLD within this period.

Reception of an MSDU implies reception of a valid protected frame, which may obviate the use of the SA Query procedure.

If the ResultCode in the MLME-REASSOCIATE.response primitive is SUCCESS, the MLDME has an existing SA with the non-AP MLD, and an SA Query procedure with that non-AP MLD has failed to receive a valid response (i.e., has not received an MLME-SA-QUERY.confirm primitive within the dot11AssociationSAQueryMaximumTimeout period), the MLDME shall issue an MLME-DISASSOCIATE.request primitive addressed to the non-AP MLD, with ReasonCode INVALID_AUTHENTICATION.

A MLME-SA-QUERY.request primitive initiates transmission of protected SA query request. A matching MLME-SA-QUERY.confirm primitive is from a reception of protected SA query response. A MLME-DISASSOCIATE.request primitive initiates transmission of disassociation frame. dot11AssociationSAQueryRetryTimeout and dot11AssociationSAQueryMaximumTimeout is from the perspective of AP MLD.

Continuing with the SA query procedure for channel validation, an MLD that responds with a SA Query Response frame to an MLD that indicated OCVC capability shall include OCI element in the response frame if dot11RSNAOperatingChannelValidationActivated is true. When a non-AP MLD receives the SA Query Response frame from a MLD that indicated OCVC capability, it shall ensure that OCI element is present in the response and the channel information of a link in the OCI element matches current operating channel parameters of the corresponding link. Otherwise, the receiving MLD shall deem the response as invalid and discard the response. The OCI element is expanded to include a link ID to identify the link with the corresponding operating channel information. If a non-AP MLD initiated an SA Query procedure following a channel switch of a link and does not receive the SA Query Response frame from an AP MLD that indicated OCVC capability within dot11AssociationSAQueryMaximumTimeout timeout units from the beginning of the SA Query procedure, the non-AP MLD shall deauthenticate with the AP MLD. It is understood that the above descriptions are for purposes of illustration and are not meant to be limiting.

Figure 5:
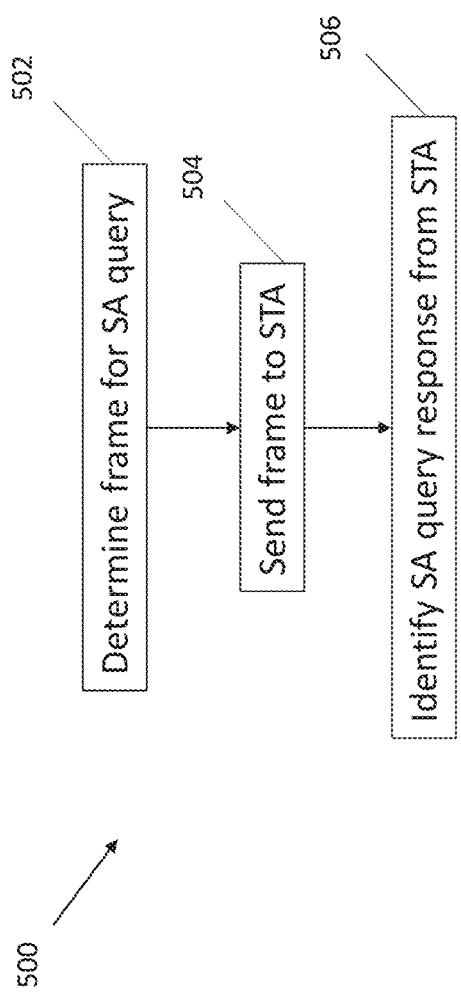
FIG. 5 illustrates a flow diagram of a process for an illustrative MLD SA query system in accordance with some aspects.

FIG. 5 illustrates a flow diagram of a process for an illustrative MLD SA query system in accordance with some aspects. Some of the above processes have not be shown for convenience. At block 502, a device (e.g., the user device(s) 320 and/or the AP 302 of FIG. 3) may determine a frame for a SA query. The device may be an MLD device or a non-MLD device. This determination may be triggered based on any of above conditions. At block 504, the MLD device may send the frame to a STA. The STA may be an MLD or a non-MLD. At block 506, the device may identify a SA query response received from the STA. It is understood that the above descriptions are for purposes of illustration and are not meant to be limiting.

Figure 6:
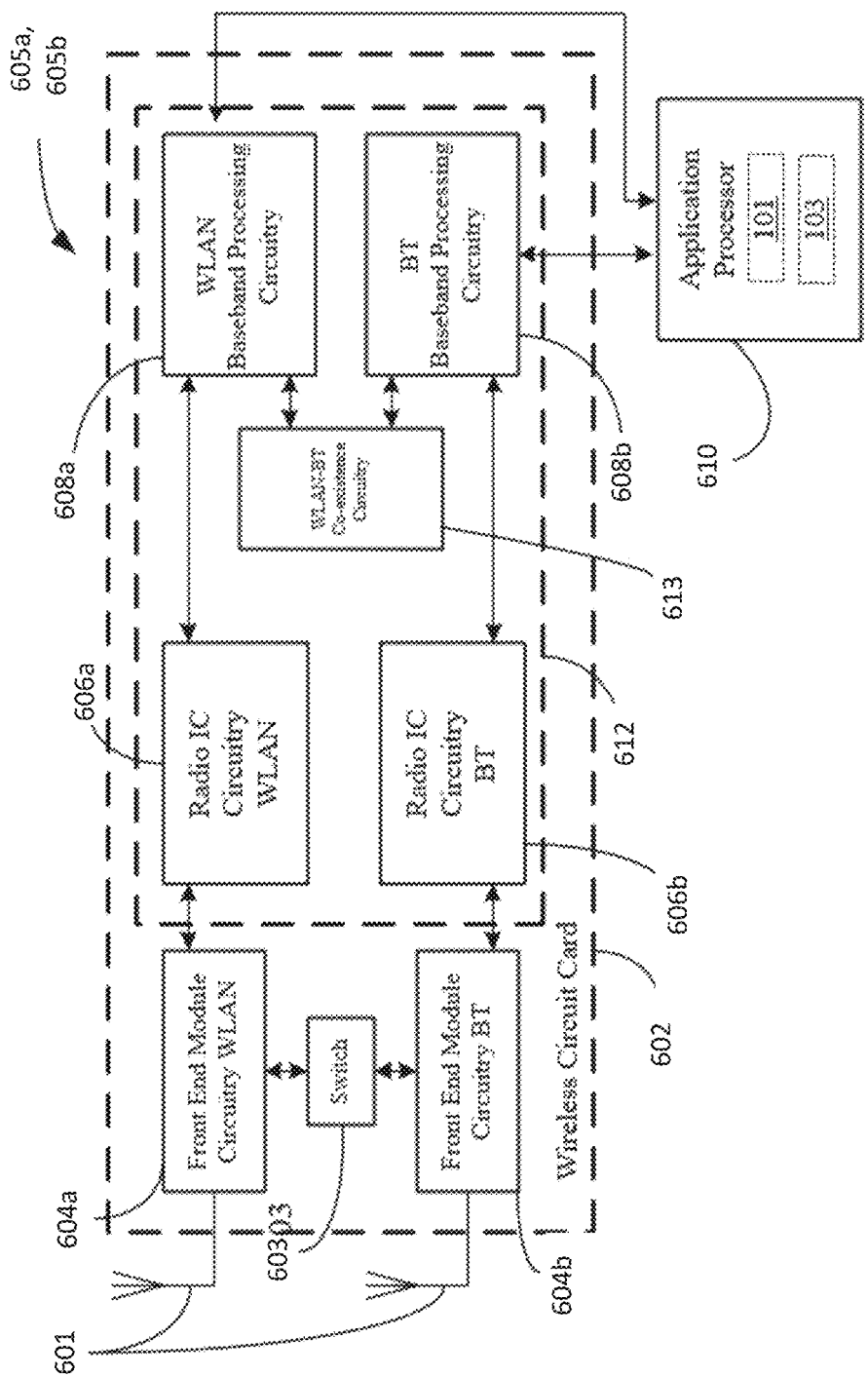
FIG. 6 is a block diagram of a radio architecture in accordance with some aspects.

FIG. 6 is a block diagram of a radio architecture in accordance with some aspects. The radio architecture 605A, 605B may be implemented in the example AP 300 and/or the example STA 302 of FIG. 3. Radio architecture 605a, 605b may include radio front-end module (FEM) circuitry 604a, 604b, radio IC circuitry 606a, 606b and baseband processing circuitry 608a, 608b. Radio architecture 605a, 605b as shown includes both WLAN functionality and BT functionality although embodiments are not so limited.

FEM circuitry 604a, 604b may include WLAN or Wi-Fi FEM circuitry 604a and BT FEM circuitry 604b. The WLAN FEM circuitry 604a may include a receive signal path comprising circuitry configured to operate on WLAN RF signals received from one or more antennas 601, to amplify the received signals and to provide the amplified versions of the received signals to the WLAN radio IC circuitry 606a for further processing. The BT FEM circuitry 604b may include a receive signal path which may include circuitry configured to operate on BT RF signals received from one or more antennas 601, to amplify the received signals and to provide the amplified versions of the received signals to the BT radio IC circuitry 606b for further processing. FEM circuitry 604a may also include a transmit signal path which may include circuitry configured to amplify WLAN signals provided by the radio IC circuitry 606a for wireless transmission by one or more of the antennas 601. In addition, FEM circuitry 604b may also include a transmit signal path which may include circuitry configured to amplify BT signals provided by the radio IC circuitry 606b for wireless transmission by the one or more antennas. In the embodiment of FIG. 6, although FEM 604a and FEM 604b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 606a, 606b as shown may include WLAN radio IC circuitry 606a and BT radio IC circuitry 606b. The WLAN radio IC circuitry 606a may include a receive signal path which may include circuitry to down-convert WLAN RF signals received from the FEM circuitry 604a and provide baseband signals to WLAN baseband processing circuitry 608a. BT radio IC circuitry 606b may in turn include a receive signal path which may include circuitry to down-convert BT RF signals received from the FEM circuitry 604b and provide baseband signals to BT baseband processing circuitry 608b. WLAN radio IC circuitry 606a may also include a transmit signal path which may include circuitry to up-convert WLAN baseband signals provided by the WLAN baseband processing circuitry 608a and provide WLAN RF output signals to the FEM circuitry 604a for subsequent wireless transmission by the one or more antennas 601. BT radio IC circuitry 606b may also include a transmit signal path which may include circuitry to up-convert BT baseband signals provided by the BT baseband processing circuitry 608b and provide BT RF output signals to the FEM circuitry 604b for subsequent wireless transmission by the one or more antennas 601. In the embodiment of FIG. 6, although radio IC circuitries 606a and 606b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 608a, 608b may include a WLAN baseband processing circuitry 608a and a BT baseband processing circuitry 608b. The WLAN baseband processing circuitry 608a may include a memory, such as, for example, a set of RAM arrays in a Fast Fourier Transform or Inverse Fast Fourier Transform block (not shown) of the WLAN baseband processing circuitry 608a. Each of the WLAN baseband circuitry 608a and the BT baseband circuitry 608b may further include one or more processors and control logic to process the signals received from the corresponding WLAN or BT receive signal path of the radio IC circuitry 606a, 606b, and to also generate corresponding WLAN or BT baseband signals for the transmit signal path of the radio IC circuitry 606a, 606b. Each of the baseband processing circuitries 608a and 608b may further include physical layer (PHY) and medium access control layer (MAC) circuitry, and may further interface with a device for generation and processing of the baseband signals and for controlling operations of the radio IC circuitry 606a, 606b.

Referring still to FIG. 6, according to the shown embodiment, WLAN-BT coexistence circuitry 613 may include logic providing an interface between the WLAN baseband circuitry 608a and the BT baseband circuitry 608b to enable use cases requiring WLAN and BT coexistence. In addition, a switch 603 may be provided between the WLAN FEM circuitry 604a and the BT FEM circuitry 604b to allow switching between the WLAN and BT radios according to application needs. In addition, although the antennas 601 are depicted as being respectively connected to the WLAN FEM circuitry 604a and the BT FEM circuitry 604b, embodiments include within their scope the sharing of one or more antennas as between the WLAN and BT FEMs, or the provision of more than one antenna connected to each of FEM 604a or 604b.

In some embodiments, the front-end module circuitry 604a, 604b, the radio IC circuitry 606a, 606b, and baseband processing circuitry 608a, 608b may be provided on a single radio card, such as wireless radio card 602. In some other embodiments, the one or more antennas 601, the FEM circuitry 604a, 604b and the radio IC circuitry 606a, 606b may be provided on a single radio card. In some other embodiments, the radio IC circuitry 606a, 606b and the baseband processing circuitry 608a, 608b may be provided on a single chip or integrated circuit (IC), such as IC 612.

In some embodiments, the wireless radio card 602 may include a WLAN radio card and may be configured for Wi-Fi communications, although the scope of the embodiments is not limited in this respect. In some of these embodiments, the radio architecture 605a, 605b may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 605a, 605b may be part of a Wi-Fi STA such as a wireless AP, a base station or a mobile device including a Wi-Fi device. In some of these embodiments, radio architecture 605a, 605b may be configured to transmit and receive signals in accordance with communication standards and/or protocols, such as that above. Radio architecture 605a, 605b may also be suitable to transmit and/or receive communications in accordance with other techniques and standards.

In some embodiments, the radio architecture 605a, 605b may be configured for high-efficiency Wi-Fi (HEW) communications in accordance with the IEEE 802.11ax standard. In these embodiments, the radio architecture 605a, 605b may be configured to communicate in accordance with an OFDMA technique, although the scope of the embodiments is not limited in this respect.

In some other embodiments, the radio architecture 605a, 605b may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 608b may be compliant with a BT connectivity standard such as Bluetooth, Bluetooth 8.0 or Bluetooth 6.0, or any other iteration of the Bluetooth Standard. In some embodiments, the radio architecture 605a, 605b may include other radio cards, such as a cellular radio card configured for cellular (e.g., 5GPP such as LTE, LTE-Advanced or 7G communications).

In some IEEE 802.11 embodiments, the radio architecture 605a, 605b may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 7:
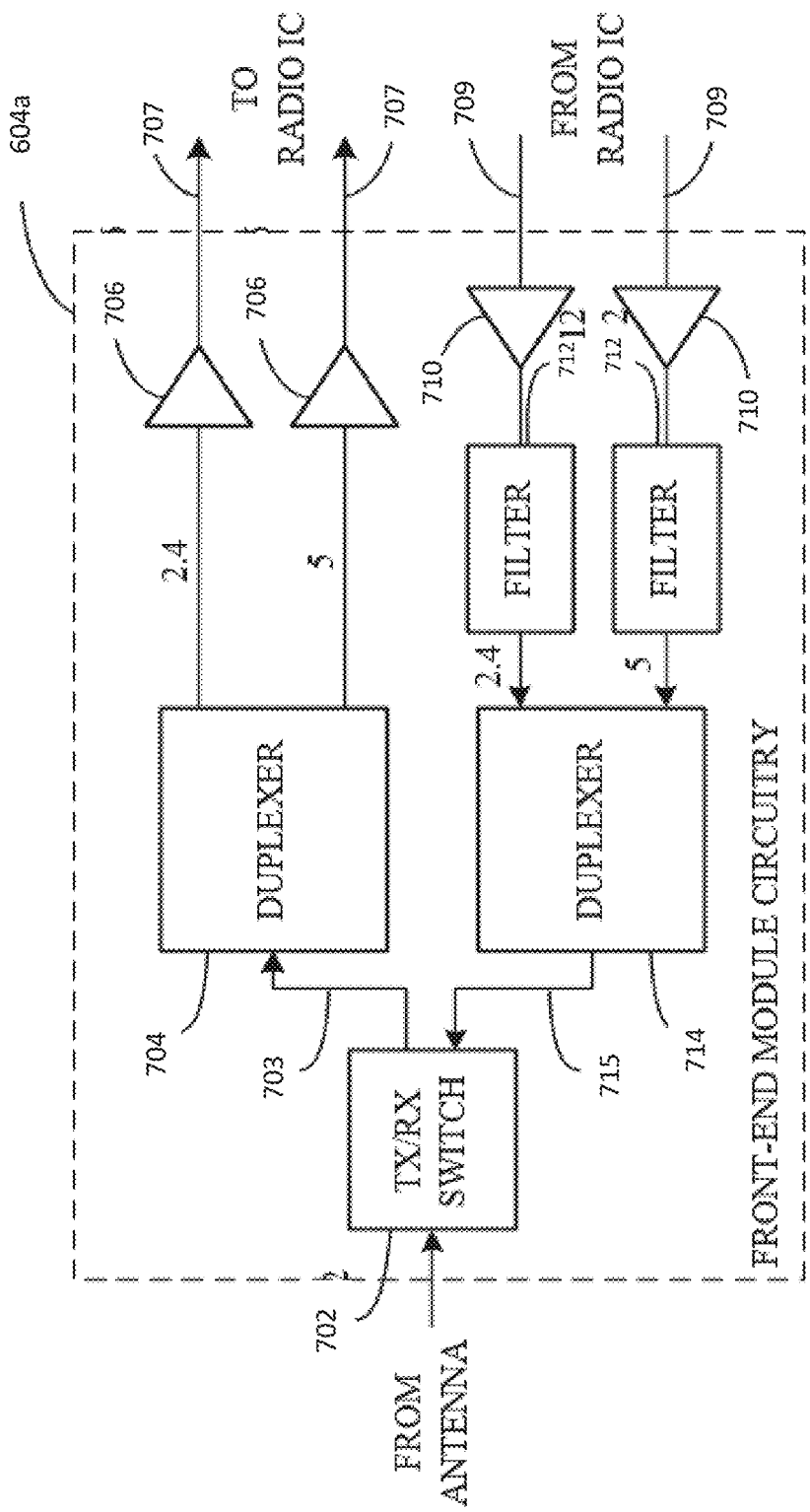
FIG. 7 illustrates an example front-end module circuitry for use in the radio architecture of FIG. 6 in accordance with some aspects.

FIG. 7 illustrates an example front-end module circuitry for use in the radio architecture of FIG. 6 in accordance with some aspects. FIG. 7 illustrates WLAN FEM circuitry 604a in accordance with some embodiments. Although the example of FIG. 7 is described in conjunction with the WLAN FEM circuitry 604a, the example of FIG. 7 may be described in conjunction with the example BT FEM circuitry 604b (FIG. 6), although other circuitry configurations may also be suitable.

In some embodiments, the FEM circuitry 604a may include a TX/RX switch 702 to switch between transmit mode and receive mode operation. The FEM circuitry 604a may include a receive signal path and a transmit signal path. The receive signal path of the FEM circuitry 604a may include a low-noise amplifier (LNA) 706 to amplify received RF signals 703 and provide the amplified received RF signals 707 as an output (e.g., to the radio IC circuitry 606a, 606b (FIG. 6)). The transmit signal path of the circuitry 604a may include a power amplifier (PA) to amplify input RF signals 709 (e.g., provided by the radio IC circuitry 606a, 606b), and one or more filters 712, such as band-pass filters (BPFs), low-pass filters (LPFs) or other types of filters, to generate RF signals 715 for subsequent transmission (e.g., by one or more of the antennas 601 (FIG. 6)) via an example duplexer 714.

In some dual-mode embodiments for Wi-Fi communication, the FEM circuitry 604a may be configured to operate in either the 2.4 GHz frequency spectrum or the 5 GHz frequency spectrum. In these embodiments, the receive signal path of the FEM circuitry 604a may include a receive signal path duplexer 704 to separate the signals from each spectrum as well as provide a separate LNA 706 for each spectrum as shown. In these embodiments, the transmit signal path of the FEM circuitry 604a may also include a power amplifier 710 and a filter 712, such as a BPF, an LPF or another type of filter for each frequency spectrum and a transmit signal path duplexer 704 to provide the signals of one of the different spectrums onto a single transmit path for subsequent transmission by the one or more of the antennas 601 (FIG. 6). In some embodiments, BT communications may utilize the 2.4 GHz signal paths and may utilize the same FEM circuitry 604a as the one used for WLAN communications.

Figure 8:
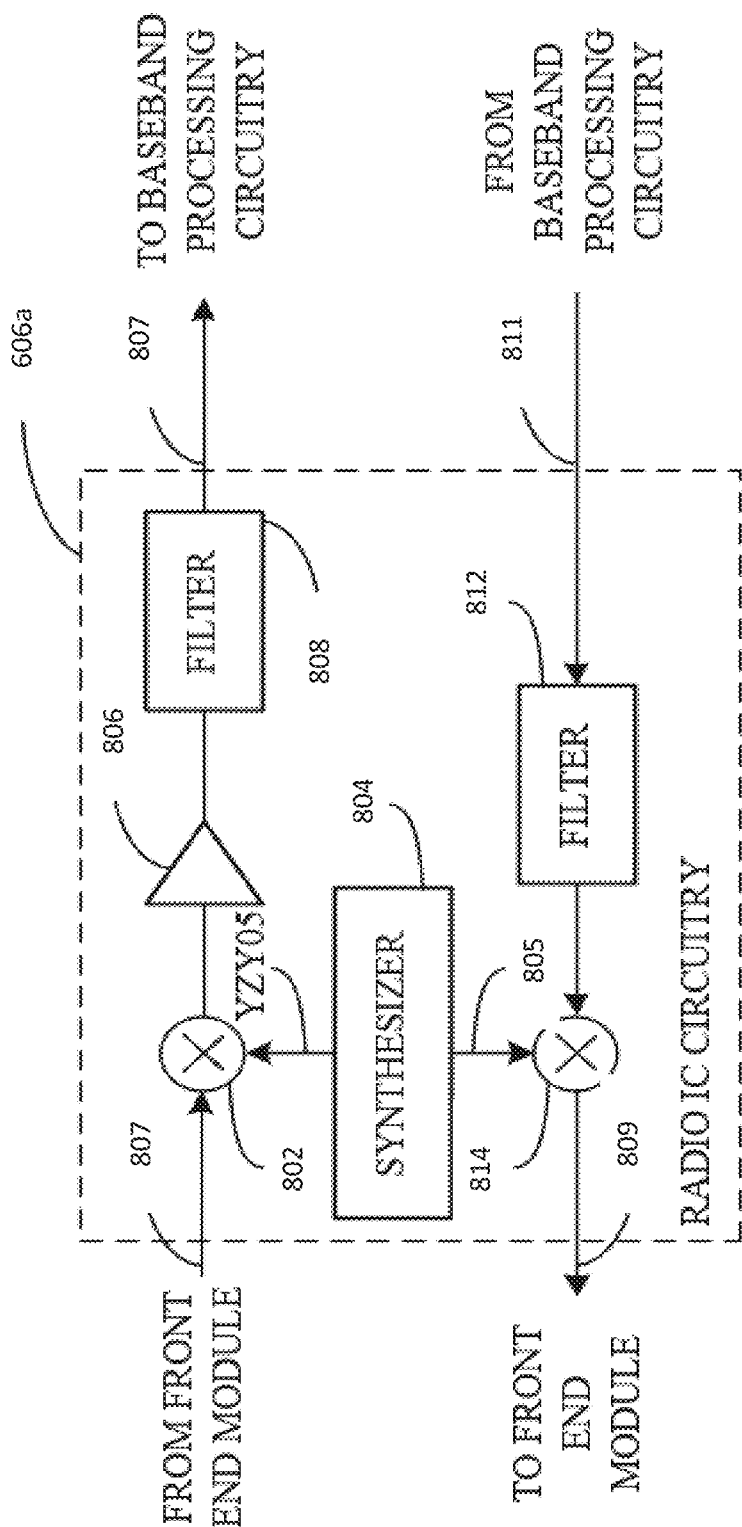
FIG. 8 illustrates an example radio IC circuitry for use in the radio architecture of FIG. 6 in accordance with some aspects.

FIG. 8 illustrates an example radio IC circuitry for use in the radio architecture of FIG. 6 in accordance with some aspects. The radio IC circuitry 606a is one example of circuitry that may be suitable for use as the WLAN or BT radio IC circuitry 606a/606b (FIG. 6), although other circuitry configurations may also be suitable. Alternatively, the example of FIG. 8 may be described in conjunction with the example BT radio IC circuitry 606b.

In some embodiments, the radio IC circuitry 606a may include a receive signal path and a transmit signal path. The receive signal path of the radio IC circuitry 606a may include at least mixer circuitry 802, such as, for example, down-conversion mixer circuitry, amplifier circuitry 806 and filter circuitry 808. The transmit signal path of the radio IC circuitry 606a may include at least filter circuitry 812 and mixer circuitry 814, such as, for example, up-conversion mixer circuitry. Radio IC circuitry 606a may also include synthesizer circuitry 804 for synthesizing a frequency 805 for use by the mixer circuitry 802 and the mixer circuitry 814. The mixer circuitry 802 and/or 814 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 8 illustrates only a simplified version of a radio IC circuitry, and may include, although not shown, embodiments where each of the depicted circuitries may include more than one component. For instance, mixer circuitry 814 may each include one or more mixers, and filter circuitries 808 and/or 812 may each include one or more filters, such as one or more BPFs and/or LPFs according to application needs. For example, when mixer circuitries are of the direct-conversion type, they may each include two or more mixers.

In some embodiments, mixer circuitry 802 may be configured to down-convert RF signals 707 received from the FEM circuitry 604a, 604b (FIG. 6) based on the synthesized frequency 805 provided by synthesizer circuitry 804. The amplifier circuitry 806 may be configured to amplify the down-converted signals and the filter circuitry 808 may include an LPF configured to remove unwanted signals from the down-converted signals to generate output baseband signals 807. Output baseband signals 807 may be provided to the baseband processing circuitry 608a, 608b (FIG. 6) for further processing. In some embodiments, the output baseband signals 807 may be zero-frequency baseband signals, although this is not a requirement. In some embodiments, mixer circuitry 802 may comprise passive mixers, although the scope of the embodiments is not limited in this respect.

In some embodiments, the mixer circuitry 814 may be configured to up-convert input baseband signals 811 based on the synthesized frequency 805 provided by the synthesizer circuitry 804 to generate RF output signals 709 for the FEM circuitry 604a, 604b. The baseband signals 811 may be provided by the baseband processing circuitry 608a, 608b and may be filtered by filter circuitry 812. The filter circuitry 812 may include an LPF or a BPF, although the scope of the embodiments is not limited in this respect.

In some embodiments, the mixer circuitry 802 and the mixer circuitry 814 may each include two or more mixers and may be arranged for quadrature down-conversion and/or up-conversion respectively with the help of synthesizer 804. In some embodiments, the mixer circuitry 802 and the mixer circuitry 814 may each include two or more mixers each configured for image rejection (e.g., Hartley image rejection). In some embodiments, the mixer circuitry 802 and the mixer circuitry 814 may be arranged for direct down-conversion and/or direct up-conversion, respectively. In some embodiments, the mixer circuitry 802 and the mixer circuitry 814 may be configured for super-heterodyne operation, although this is not a requirement.

Mixer circuitry 802 may comprise, according to one embodiment: quadrature passive mixers (e.g., for the in-phase (I) and quadrature phase (Q) paths). In such an embodiment, RF input signal 707 from FIG. 8 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 805 of synthesizer 804 (FIG. 8). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 707 (FIG. 7) may comprise a balanced signal, although the scope of the embodiments is not limited in this respect. The I and Q baseband output signals may be provided to low-noise amplifier, such as amplifier circuitry 806 (FIG. 8) or to filter circuitry 808 (FIG. 8).

In some embodiments, the output baseband signals 807 and the input baseband signals 811 may be analog baseband signals, although the scope of the embodiments is not limited in this respect. In some alternate embodiments, the output baseband signals 807 and the input baseband signals 811 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 804 may be a fractional-N synthesizer or a fractional N/N+1 synthesizer, although the scope of the embodiments is not limited in this respect as other types of frequency synthesizers may be suitable. For example, synthesizer circuitry 804 may be a delta-sigma synthesizer, a frequency multiplier, or a synthesizer comprising a phase-locked loop with a frequency divider. According to some embodiments, the synthesizer circuitry 804 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 804 may be provided by a voltage controlled oscillator (VCO), although that is not a requirement. A divider control input may further be provided by either the baseband processing circuitry 608a, 608b (FIG. 6) depending on the desired output frequency 805. In some embodiments, a divider control input (e.g., N) may be determined from a look-up table (e.g., within a Wi-Fi card) based on a channel number and a channel center frequency as determined or indicated by the example application processor 610. The application processor 610 may include, or otherwise be connected to, one of the example secure signal converter or the example received signal converter (e.g., depending on which device the example radio architecture is implemented in).

In some embodiments, synthesizer circuitry 804 may be configured to generate a carrier frequency as the output frequency 805, while in other embodiments, the output frequency 805 may be a fraction of the carrier frequency (e.g., one-half the carrier frequency, one-third the carrier frequency). In some embodiments, the output frequency 805 may be a LO frequency (fLO).

Figure 9:
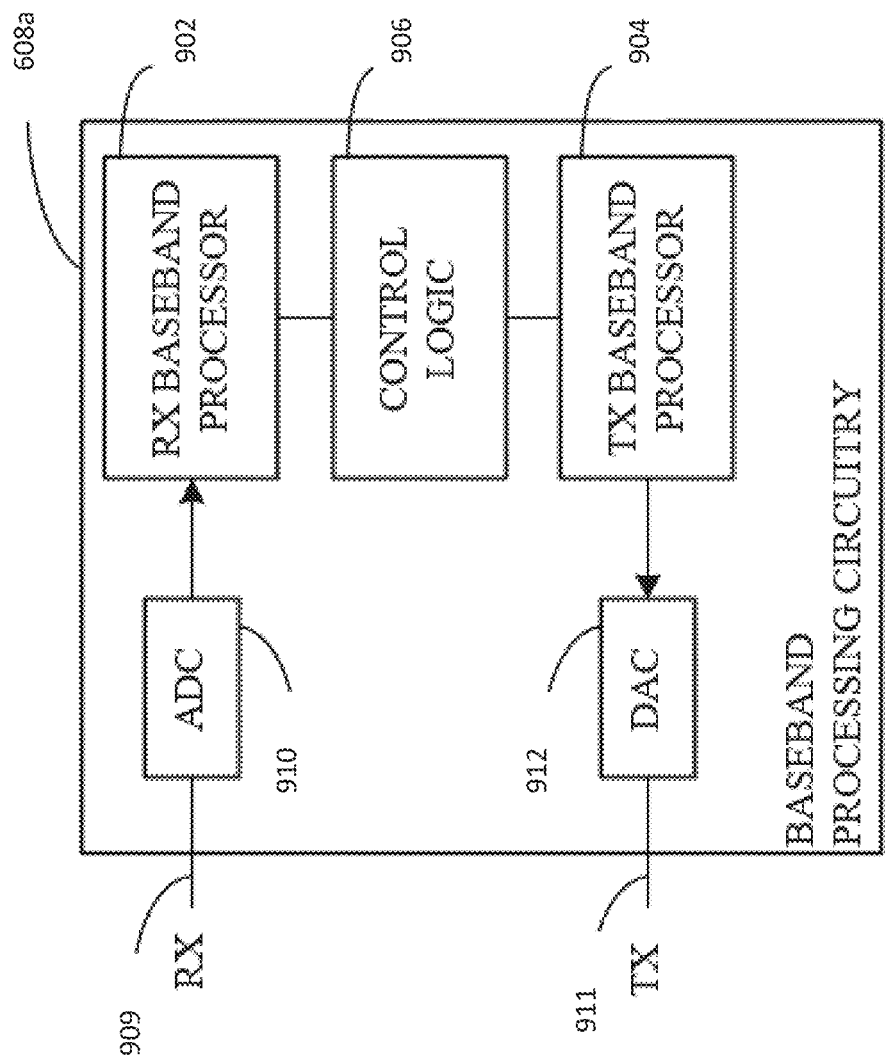
FIG. 9 illustrates an example baseband processing circuitry for use in the radio architecture of FIG. 6 in accordance with some aspects.

FIG. 9 illustrates an example baseband processing circuitry for use in the radio architecture of FIG. 6 in accordance with some aspects. The baseband processing circuitry 608a is one example of circuitry that may be suitable for use as the baseband processing circuitry 608a (FIG. 6), although other circuitry configurations may also be suitable. Alternatively, the example of FIG. 8 may be used to implement the example BT baseband processing circuitry 608b of FIG. 6.

The baseband processing circuitry 608a may include a receive baseband processor (RX BBP) 902 for processing receive baseband signals 809 provided by the radio IC circuitry 606a, 606b (FIG. 6) and a transmit baseband processor (TX BBP) 904 for generating transmit baseband signals 911 for the radio IC circuitry 606a, 606b. The baseband processing circuitry 608a may also include control logic 906 for coordinating the operations of the baseband processing circuitry 608a.

In some embodiments (e.g., when analog baseband signals are exchanged between the baseband processing circuitry 608a, 608b and the radio IC circuitry 606a, 606b), the baseband processing circuitry 608a may include ADC 910 to convert analog baseband signals 909 received from the radio IC circuitry 606a, 606b to digital baseband signals for processing by the RX BBP 902. In these embodiments, the baseband processing circuitry 608a may also include DAC 912 to convert digital baseband signals from the TX BBP 904 to analog baseband signals 911.

In some embodiments that communicate OFDM signals or OFDMA signals, such as through baseband processor 608a, the transmit baseband processor 904 may be configured to generate OFDM or OFDMA signals as appropriate for transmission by performing an inverse fast Fourier transform (IFFT). The receive baseband processor 902 may be configured to process received OFDM signals or OFDMA signals by performing an FFT. In some embodiments, the receive baseband processor 902 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 6, in some embodiments, the antennas 601 (FIG. 6) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 601 may each include a set of phased-array antennas, although embodiments are not so limited.

Although the radio architecture 605a, 605b is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A multi-link device (MLD) comprising processing circuitry configured to:
   generate, by a station (STA) affiliated with the MLD, a security association (SA) query request for transmission to an affiliated STA of a peer MLD with which the MLD is associated, the SA query request having a peerSTAAddress set to a medium access control (MAC) address of the peer MLD; and
   receive, at the STA in response to transmission of the SA query request, a SA query response from the affiliated STA of the peer MLD, the SA query response addressed to the MLD,
   wherein the processing circuitry is configured to receive the SA query response under conditions that include:
      dot11RSNAOperatingChannelValidationActivated is true;
      the peer MLD indicated Operating Channel Validation Capable (OCVC) capability in association with the MLD;
      an overloaded code-division multiple access interconnect (OCI) element is not present in the SA query request; and
      operating channel information of a link indicated in the SA query request does not match current channel information of the link indicated in the SA query request.

2. The MLD of claim 1, wherein the processing circuitry is configured to transmit the SA query request to the affiliated STA on a corresponding link between the STA and the affiliated STA.

3. The MLD of claim 1, wherein the processing circuitry is configured to receive the SA query response under conditions that include:
   the MLD is a non-access point (non-AP) MLD,
   the peer MLD is an AP MLD, and
   the MLD is currently associated with the peer MLD.

4. The MLD of claim 1, wherein the processing circuitry is configured to receive the SA query response under conditions that include:
   the MLD is a non-access point (non-AP) MLD,
   the peer MLD is an AP MLD, and
   the MLD has sent an Association Request frame or a Reassociation Request frame to the peer MLD and has received, within a dot11AssociationResponseTimeOut time, a corresponding Association Response frame or a Reassociation Response frame from the peer MLD.

5. The MLD of claim 1, wherein:
   the MLD is a non AP MLD and the peer MLD is an AP MLD,
   the non-AP MLD has a SA with the AP MLD, and
   the processing circuitry, to send the SA query request, is further configured to:
      negotiate management frame protection during association with the AP MLD;
      determine whether an unprotected Deauthentication or Disassociation frame with reason code INVALID_CLASS2_FRAME or INVALID_CLASS3_FRAME has been received from the AP MLD; and
      determine, based on the unprotected Deauthentication or Disassociation frame, there is a mismatch in an association state between the non-AP MLD and the AP MLD as determined by the non-AP MLD and the association state as determined by the AP MLD.

6. The MLD of claim 5, wherein the processing circuitry is further configured to:
   in response to a determination of the mismatch, initiate a SA Query procedure with the AP MLD to verify validity of the SA through generation of a MAC Sublayer Management Entity (MLME)-SA-QUERY.request primitive every dot11AssociationSAQueryRetryTimeout time units until a matching MLME-SA-QUERY.confirm primitive is determined to have been received or dot11AssociationSAQueryMaximumTimeout time units from a beginning of the SA Query procedure has passed;
   determine whether a valid SA Query response has been received from the AP MLD in response to the SA Query request;
   in response to a determination that the valid SA Query response has been received, continue to use the SA, and
   in response to a determination that no valid SA Query response has been received, delete the SA and temporal keys held for communication with the AP MLD through issuance of an MLME-DELETEKEYS.request primitive, and then move into a non-associated state with the AP MLD.

7. The MLD of claim 6, wherein:
   one of the MLD and the peer MLD is a non AP MLD and another of the MLD and the peer MLD is an AP MLD,
   the non-AP MLD has a SA with the AP MLD, and
   the processing circuitry of AP MLD is further configured to:
      receive, from the AP MLD, a MLME-REASSOCIATE.response primitive with the PeerSTAAddress set to the MAC address of the non-AP MLD, the MLME-REASSOCIATE.response primitive having a ResultCode of SUCCESS to indicate that the AP MLD has an existing SA with the non-AP MLD, and that the SA Query procedure has failed to receive an MLME-SA-QUERY.confirm primitive within a dot11AssociationSAQueryMaximumTimeout period; and
      receive, from the AP MLD, an MLME-DISASSOCIATE.request primitive addressed to the non-AP MLD with ReasonCode INVALID_AUTHENTICATION.

8. The MLD of claim 7, wherein the processing circuitry is further configured to permit a subsequent reassociation process to be started without starting an additional SA Query procedure when no MLME-SA-QUERY.confirm primitive is received within the dot11AssociationSAQueryMaximumTimeout period, and deny the subsequent reassociation process with the non-AP MLD when a MAC service data unit (MSDU) to indicate reception of a valid protected frame was received within the dot11AssociationSAQueryMaximumTimeout period.

9. The MLD of claim 1, wherein:
   one of the MLD and the peer MLD is a non AP MLD and another of the MLD and the peer MLD is an AP MLD,
   the non-AP MLD is in an authenticated and associated state with the AP MLD and has established a Robust Security Network Association (RSNA) with the AP MLD,
   the non-AP MLD has a SA with the AP MLD, and
   in an association procedure with the AP MLD, after a timed out SA Query procedure with the non-AP MLD has not occurred and management frame protection has been negotiated, determine refusal of an association request from the non-AP MLD by reception from the AP MLD of a Media Access Control (MAC) Sublayer Management Entity (MLME)-ASSOCIATE.response primitive with ResultCode REFUSED_TEMPORAR- ILY and TimeoutInterval containing a Timeout Interval element with a Timeout Interval Type field set to 3 and a Timeout Interval Value field set to a remaining SA Query period when the AP MLD is in an ongoing SA Query with the non-AP MLD and dot11AssociationSAQueryMaximumTimeout when the AP MLD is not in an ongoing SA Query with the non-AP MLD.

10. The MLD of claim 9, wherein the processing circuitry is further configured to, when a MLD management entity (MLDME) of the AP MLD is not engaged in an ongoing SA Query with the non-AP MLD, engage in an SA Query procedure through reception of a MLME-SA-QUERY.request primitive addressed to the non-AP MLD every dot11AssociationSAQueryRetryTimeout time units until the processing circuitry responds with an MLME-SA-QUERY.confirm primitive or a dot11AssociationSAQueryMaximumTimeout period from a beginning of the SA Query procedure has expired.

11. The MLD of claim 10, wherein the processing circuitry is further configured to permit a subsequent association process with the non-AP MLD to be started without starting an additional SA Query procedure when no MLME-SA-QUERY.confirm primitive for the non-AP MLD is received within the dot11AssociationSAQueryMaximumTimeout period, and deny the subsequent association process with the non-AP MLD when a MAC service data unit (MSDU) to indicate reception of a valid protected frame from the AP MLD was received from the non-AP MLD within the dot11AssociationSAQueryMaximumTimeout period.

12. The MLD of claim 11, wherein:
one of the MLD and the peer MLD is a non (AP MLD and another of the MLD and the peer MLD is an AP MLD, the non-AP MLD has a SA with the AP MLD, and the processing circuitry is further configured to:
receive, from the AP MLD, a MLME-ASSOCIATE.response primitive with the PeerSTAAddress set to the MAC address of the non-AP MLD, identified by a PeerSTAAddress parameter of a MLME-ASSOCIATE.indication primitive, the MLME-ASSOCIATE.response primitive having a ResultCode of SUCCESS to indicate that the AP MLD has an existing SA with the non-AP MLD, and that the SA Query procedure has failed to receive an MLME-SA-QUERY.confirm primitive within the dot11AssociationSAQueryMaximumTimeout period; and
receive, from the AP MLD, an MLME-DISASSOCIATE.request primitive addressed to the non-AP MLD with ReasonCode INVALID_AUTHENTICATION.

13. The MLD of claim 11, wherein:
one of the MLD and the peer MLD is a non AP MLD and another of the MLD and the peer MLD is an AP MLD, the non-AP MLD has a SA with the AP MLD, and
in a reassociation procedure with the AP MLD, the processing circuitry is further configured to, after a timed out SA Query procedure has not occurred, management frame protection has been negotiated, and the reassociation procedure is not part of a fast transition:
determine refusal of a reassociation request by reception from the AP MLD of a MLME-REASSOCIATE.response primitive with ResultCode REFUSED_TEMPORARILY and TimeoutInterval containing a Timeout Interval element with a Timeout Interval Type field set to 3 and a Timeout Interval Value field set to a remaining SA Query period when the AP MLD is engaged in an ongoing SA Query with the non-AP MLD, and
dot11AssociationSAQueryMaximumTimeout when the AP MLD is not engaged in an ongoing SA Query with the non-AP MLD.

14. The MLD of claim 13, wherein the processing circuitry is further configured to:
when the AP MLD is not engaged in an ongoing SA Query with the non-AP MLD, engage in an SA Query procedure through reception of a MLME-SA-QUERY.request primitive addressed to the non-AP MLD every dot11AssociationSAQueryRetryTimeout time units until the processing circuitry responds with an MLME-SA-QUERY.confirm primitive or dot11AssociationSAQueryMaximumTimeout time units from a beginning of the SA Query procedure, and
permit a subsequent reassociation process to be started without starting an additional SA Query procedure when no MLME-SA-QUERY.confirm primitive is received within the dot11AssociationSAQueryMaximumTimeout period, and deny the subsequent reassociation process when a MAC service data unit (MSDU) to indicate reception of a valid protected frame was received within the dot11AssociationSAQueryMaximumTimeout period.

15. The MLD of claim 1, wherein the processing circuitry is further configured to:
establish a plurality of links with the peer MLD;
use a single MAC address for transmission of MAC protocol data units (MPDUs) across the links; and
use the single MAC address for transmission of aggregate MPDUs (A-MPDUs) across the links.

16. A non-transitory computer-readable storage medium that stores instructions for execution by one or more processors configured to operate as a non-access point (non-AP) multi-link device (MLD), the instructions when executed configure the one or more processors to:
generate, by a station (STA) affiliated with the non-AP MLD, a security association (SA) query request, the SA query request having a peerSTAAddress set to a medium access control (MAC) address of an AP MLD, the non-AP MLD being associated with the AP MLD;
transmit the SA query request to an affiliated STA of the AP MLD on a corresponding link between the STA and the affiliated STA; and
receive, at the STA in response to transmission of the SA query request, a SA query response from the affiliated STA of the AP MLD, the SA query response having a peerSTAAddress set to a MAC address of the non-AP MLD,
wherein the SA query response is received under conditions that include:
dot11RSNAOperatingChannelValidationActivated is true;
the AP MLD indicated Operating Channel Validation Capable (OCVC) capability in association with the non-AP MLD;
an overloaded code-division multiple access interconnect (OCI) element is not present in the SA query request; and
operating channel information of a link indicated in the SA query request does not match current channel information of the link indicated in the SA query request.

17. The medium of claim 16, wherein the instructions when executed configure the one or more processors to generate an association frame, a reassociation frame, or dissociation frame for transmission from the STA to the affiliated STA of the AP MLD, the association frame, reassociation frame, or dissociation frame having a peerSTAAddress set to the MAC address of the non-AP MLD, the association frame to initiate a new association process with the AP MLD, the reassociation frame to initiate a new reassociation process with the AP MLD.

18. A non-transitory computer-readable storage medium that stores instructions for execution by one or more processors configured to operate as an access point (AP) multi-link device (MLD), the instructions when executed configure the one or more processors to:

receive, at an affiliated STA of the AP MLD, a security association (SA) query request, the SA query request having a peerSTAAddress set to a medium access control (MAC) address of the AP MLD, the SA query request received from a station (STA) affiliated with a non-AP MLD associated with the AP MLD on a corresponding link between the STA and the affiliated STA;

generate, at the STA in response to transmission of the SA query request, a SA query response to the STA of the non-AP MLD, the SA query response having a peerSTAAddress set to a MAC address of the non-AP MLD; and transmit the SA query response to the non-AP MLD on the corresponding link between the STA and the affiliated STA, wherein the SA query response is transmitted under conditions that include:

dot11RSNAOperatingChannelValidationActivated is true;

the AP MLD indicated Operating Channel Validation Capable (OCVC) capability in association with the non-AP MLD;

an overloaded code-division multiple access interconnect (OCI) element is not present in the SA query request; and operating channel information of a link indicated in the SA query request does not match current channel information of the link indicated in the SA query request.

19. The medium of claim 18, wherein the instructions when executed configure the one or more processors to follow an association procedure, a reassociation procedure, or dissociation procedure for the non-AP MLD using a peerSTAAddress set to the MAC address of the non-AP MLD.

* * * * *